F. N. WHITE.
COMBINED SWINGLETREE AND EVENER.
APPLICATION FILED APR. 16, 1918.
1,334,203.
Patented Mar. 16, 1920.
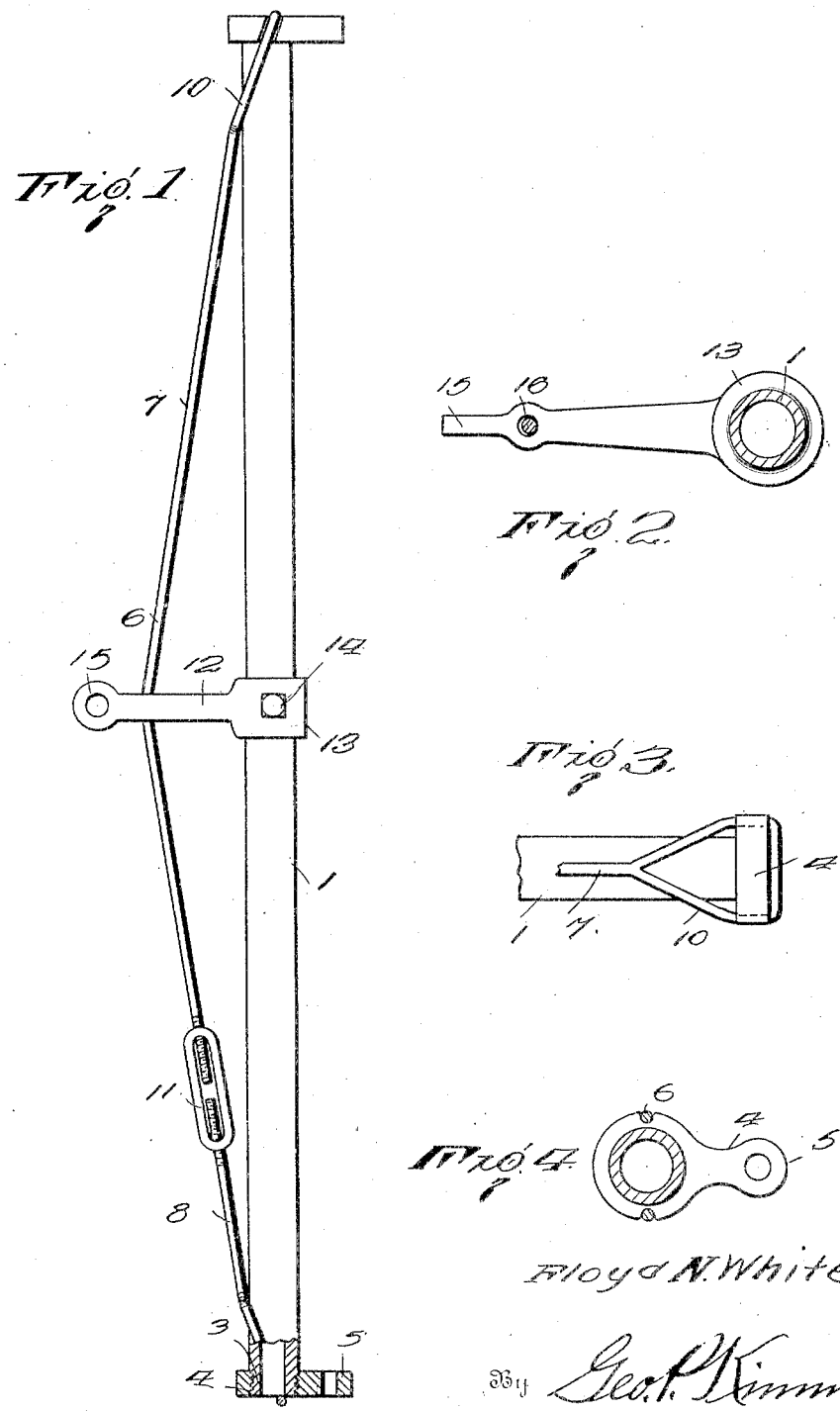
Floyd N. White
Inventor
By Geo. P. Kimmel
Attorney

UNITED STATES PATENT OFFICE.

FLOYD N. WHITE, OF BAILEY, TEXAS.

COMBINED SWINGLETREE AND EVENER.

1,334,203.  Specification of Letters Patent.  Patented Mar. 16, 1920.

Application filed April 16, 1918. Serial No. 228,880.

*To all whom it may concern:*

Be it known that I, FLOYD N. WHITE, a citizen of the United States, residing at Bailey, in the county of Fannin and State of Texas, have invented certain new and useful Improvements in Combined Swingletrees and Eveners, of which the following is a specification.

This invention relates generally to improvements in draft devices and more particularly has reference to a combined swingletree and doubletree or evener bar.

The invention has for its primary object to provide a draft device designed to be used as a doubletree or evener bar; or as a swingletree and when used in the former capacity is designed to equalize strain on the main bar in addition to equalizing the draft and when used in the latter capacity, serves to equalize the strain.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawings:

Figure 1 is a plan view of the device,

Fig. 2 is a vertical transverse section through the same.

Fig. 3 is a front elevation of one end of the device, and

Fig. 4 is an end elevation of the device with the end portion of the truss connecting loop broken away.

In describing my invention, I shall refer to the drawings in which similar reference characters designate corresponding parts throughout the several views.

The numeral 1 designates a body portion which is formed preferably of a tubular rod having its opposite ends externally threaded as shown at 3 and positioned on said ends are connecting members 4 which are threaded thereon, said members being provided with forwardly projecting hooks or eyes 5 for connection in a swingle tree or double tree or with straight faces, while said members are provided at diametrically opposite points thereon with inclined notches 6 in their outer peripheries for a purpose to be hereinafter more fully described.

The swingletree has connected therewith a longitudinally extensible truss bar 6 which is formed of two unequal length sections of rod metal the longer section being designated by the numeral 7 and the shorter section by the numeral 8. These sections have their outer ends formed with loops 10 thereon adapted to be positioned over the ends of the swingletree and portions of said loops being disposed in the inclined notches 6 of the connecting members 4 as is clearly shown in Figs. 1 and 3 of the drawings. The inner ends of the sections of the truss bar are externally threaded and are connected by a turn buckle 11.

The device is provided with means to space the intermediate portions of the truss bar and swingletree, said means comprising a spacing member 12 having an enlarged loop 13 formed at one end thereof, and slidably mounted on the swingletree. A set-screw 14 is positioned through said loop so that the spacing member is adapted to be locked on the swingletree in various longitudinally adjusted positions. The outer end of the spacing member has a connecting loop 15 formed thereon that is disposed at right angles to the loop 13 and which is for connection with a vehicle and used as a swingletree or with an evener bar or doubletree, as is obvious to those skilled in this art. The spacing member is provided adjacent its outer end with an aperture 16 therethrough, through which the truss rod is adapted to pass.

In operation, the spacing member is normally positioned on the device as shown in Fig. 1 of the drawings, and the truss bar will be spaced at its middle portion from the mid-portion of the body portion. The truss bar is tightened owing to the fact that the same is longitudinally extensible by the turnbuckle 11, and the looped ends of said bar are securely engaged around the ends of the body portion by having their end portions positioned over the ends of the body portion and the sides of the loops arranged in the notches 6 of the connecting members 4. When it is desired to adjust the spacing member so that the device will be operated as a draft equalizer, the tension of the truss bar is released and the set-screw withdrawn whereby the spacing member may be moved in either direction on the body portion as desired. When having reached the desired position, the set-screw is once more tightened and the turnbuckle likewise rotated to renew the tension on the truss bar. This will change the position of the connecting loop 13 so as to change the draft of the body portion as is obvious.

From the foregoing description taken in connection with the accompanying drawings, it is thought that a clear and comprehensive understanding of the construction, operation and advantages of my invention may be had, and while I have shown and described the device as embodying a specific structure I desire that it be understood that such changes may be made in said structure as do not depart from the spirit and scope of the invention as claimed.

Having fully described my invention, what I claim as new and desire to secure by Letters Patent, is:

A device of the character described comprising a body portion, connecting members having threaded engagement with opposite ends of the body portion, a spacing member adjustable lengthwise of said body portion, a sectional truss bar having slidable engagement with the spacing member, loops forming the outer terminals of the sections having removable engagement with the connecting members by being received about the ends of said connecting members and body portion, and means for adjustably connecting the inner ends of the sections of the truss bar together for holding the truss bar in engagement with said connecting members.

In testimony whereof I affix my signature hereto.

FLOYD N. WHITE.